(12) United States Patent
Tsaih et al.

(10) Patent No.: US 12,572,893 B2
(45) Date of Patent: Mar. 10, 2026

(54) DECISION SUPPORT SYSTEM OF INDUSTRIAL COPPER PROCUREMENT

(71) Applicants: National Chengchi University, Taipei City (TW); Dinkle Enterprise Co., Ltd, New Taipei City (TW)

(72) Inventors: Rua-Huan Tsaih, Taipei City (TW); Yi-Ling Lin, Taipei City (TW); Ren-Han Yang, Taipei City (TW); Ken-Hao Shang, Taipei City (TW); Li-Ling Tsao, Taipei City (TW)

(73) Assignees: National Chengchi University, Taipei City (TW); Dinkle Enterprise Co., Ltd, New Taipei City (TW)

( * ) Notice: Subject to any disclaimer, the term of this patent is extended or adjusted under 35 U.S.C. 154(b) by 225 days.

(21) Appl. No.: 18/446,064

(22) Filed: Aug. 8, 2023

(65) Prior Publication Data

US 2024/0046208 A1 Feb. 8, 2024

(30) Foreign Application Priority Data

Aug. 8, 2022 (TW) .................................. 111129725

(51) Int. Cl.
G06Q 10/087 (2023.01)
G06N 3/08 (2023.01)
(Continued)

(52) U.S. Cl.
CPC .............. G06Q 10/087 (2013.01); G06N 3/08 (2013.01); G06Q 30/0202 (2013.01); G06Q 30/0206 (2013.01)

(58) Field of Classification Search
CPC .............. G06Q 10/087; G06Q 30/0202; G06Q 30/0206; G06Q 30/0283; G06Q 50/04; G06Q 3/082; G06N 3/08; G06N 20/00
See application file for complete search history.

(56) References Cited

U.S. PATENT DOCUMENTS

2014/0379423 A1* 12/2014 Kemmer ........... G06Q 30/0633
705/7.31

FOREIGN PATENT DOCUMENTS

CN 113112299 A * 7/2021 ............. G06F 18/24
WO WO-2021087137 A1 * 5/2021 ........... G06Q 10/087

OTHER PUBLICATIONS

Kwakkel, J.H., Auping, W.L. and Pruyt, E., 2013. Dynamic scenario discovery under deep uncertainty: The future of copper. Technological Forecasting and Social Change, 80(4), pp. 789-800. (Year: 2013).*

(Continued)

*Primary Examiner* — Thomas Yih Ho

(74) *Attorney, Agent, or Firm* — Saliwanchik, Lloyd & Eisenschenk

(57) ABSTRACT

A decision support system of the industrial copper procurement is disclosed. The decision support system includes storage device, processing device and output device. The storage device stores a plurality of copper data and a plurality of algorithms. The processing device connects to the storage device. The processing device conduct a plurality of control commands to access the storage device and to implement copper price forecasting module, copper demand forecasting module, broken copper price forecasting module and purchasing decision reasoning module. The output device connected to the storage device and the processing device. The decision recommendation is output to the decision maker by the output device for deciding the copper procurement.

8 Claims, 7 Drawing Sheets

(51) Int. Cl.
   *G06Q 30/0201*      (2023.01)
   *G06Q 30/0202*      (2023.01)

(56) References Cited

OTHER PUBLICATIONS

Liu, Chang, et al. "Forecasting copper prices by decision tree learning." Resources Policy 52 (2017): 427-434. (Year: 2017).*

Alameer, Z., Elaziz, M.A., Ewees, A.A., Ye, H. and Jianhua, Z., 2019. Forecasting copper prices using hybrid adaptive neuro-fuzzy inference system and genetic algorithms. Natural Resources Research, 28, pp. 1385-1401. (Year: 2019).*

Zhang, H., Nguyen, H., Vu, D.A., Bui, X.N. and Pradhan, B., 2021. Forecasting monthly copper price: A comparative study of various machine learning-based methods. Resources Policy, 73, p. 102189. (Year: 2021).*

* cited by examiner

DECISION SUPPORT SYSTEM OF INDUSTRIAL COPPER PROCUREMENT

CROSS-REFERENCE TO RELATED APPLICATION

This application claims the benefit of Taiwan Patent Application No. 111129725, filed on Aug. 8, 2022, the disclosure of which is incorporated by reference herein in its entirety.

BACKGROUND OF THE INVENTION

1. Field of the Invention

The present invention relates to a decision support system of industrial copper procurement, and more particularly, to a decision support system for providing decision suggestions on industrial copper materials by building forecasting models through learning algorithms.

2. Description of the Related Art

For manufacturers that manufacture and process copper materials, the raw material cost of copper occupies a very high percentage of the total production cost. Reducing production costs is a priority for manufacturers to improve. In regard to copper raw materials, copper scrap generated in the production process may be treated and then re-formed as new copper to be put into production. The copper scrap, even when reprocessing costs are added, may be much cheaper than buying new copper directly. Accordingly, manufacturers often use copper replacement to reduce raw material costs. Thus, the copper replacement has also become one of the important research topics.

Conventionally, manufacturers have purchased new products or recovered scrap metals as raw material sources. In general, decisions are conducted based on empirical rules. Such a scheme may fail to optimize the cost control and make the right decision at the right timing. When copper scrap is recycled into new copper at the wrong timing, the purchase cost on the ledger may be lowered. However, when the price of copper scrap is significantly lower, the value of the copper scrap in inventory may be actually lowered.

In this regard, in an aspect of the conventional decision-making scheme, it is difficult to obtain optimal opinions on purchasing strategies and it is also difficult to ensure accuracy on the purchasing strategies. In this regard, the inventor of the present invention has considered and designed a decision support system, in particular, improved the defects in the related art, and increased the industrial applicability.

SUMMARY OF THE INVENTION

In order to improve the above-described problems in the related art, an object of the present invention is to provide a decision support system of industrial copper procurement to solve the conventional problem in that it is difficult to determine the timing to buy copper or replace copper, and it is difficult to obtain support for the purchasing decision.

According to the object of the present invention, proposed is a decision support system of industrial copper procurement, which includes a storage device, a processing device and an output device. The storage device stores a plurality pieces of copper material data and a plurality of algorithms. The processing device is connected to the storage device.

The processing device executes a plurality of control instructions to accesses the storage device for conducting a copper material price forecasting module, a copper material demand forecasting module, a copper scrap price forecasting module and a purchase decision reasoning module. The copper material price forecasting module inputs a copper material price, a mineral material price, a comprehensive economic index and an exchange rate index, conducts a first learning algorithm to build a copper price forecasting model, and forecasts copper prices in the next four weeks through the copper price forecasting model. The copper material demand forecasting module inputs copper material consumption data, conducts a second learning algorithm to build a copper material demand forecasting model, and forecasts the copper material demand in the next two months through the copper material demand model. The copper scrap price forecasting module inputs a copper scrap price, a mineral material price, a comprehensive economic index and an exchange rate index, conducts a third learning algorithm to build a copper scrap price forecasting model, and forecasts copper scrap prices in the next four weeks through the copper scrap price forecasting model. The purchase decision reasoning module inputs the copper prices in the next four weeks, the copper material demand in the next two months, the copper scrap price in the next four weeks, and the other copper material data, conducts a fourth learning algorithm to build a decision reasoning model, and obtains a decision recommendation through the decision reasoning model. The output device is connected to the processing device and the storage device, and outputs decision recommendations for enabling the decision maker to carry out copper material purchase.

Preferably, the first learning algorithm, the second learning algorithm and the third learning algorithm may be adaptive learning algorithms.

Preferably, the adaptive learning algorithm may include the following steps. S11: initial data is selected through an initialization module and a linear regression operation is performed to build an initial single-layer neural network, wherein the initial single-layer neural network includes initial weight parameter; S12: adding one piece of training data every time and determining whether the number of the input training data reaches the number of all training data, if yes, a procedure stops, and if not, the procedure continues to step S13; S13: the number of training data for each round is selected through the filter module, the selection mechanism makes forecasting by substituting all the training data into the acceptable single-layer neural network obtained from a previous round. Thereafter, a residual sum of squares between an actual value and a predicted value in each training data is calculated and sorted, a corresponding training data amount is selected in ascending order; S14: The selected training data is substituted into the initial single-layer neural network through a filter module, to determine whether the learning target of the training data is achieved, if yes, the initial single-layer neural network is accepted and step S18 proceeds, and if not, the procedure continues to step S15; S15: The current neural network weight parameter is stored; S16: The current neural network weight parameter is adjusted through a tuning module, and to determine whether the neural network after adjusting the parameter is in an acceptable state, if the condition is acceptable, step S18 proceeds, and if not, the procedure continues to step S17; S17: The current neural network weight parameter stored in step S15 is recalled. Three hidden nodes are added through the memory reinforcement module to obtain a newly accepted single-layer neural network, and function as an acceptable single-layer neural network, and step S18 proceeds; S18: The acceptable single-layer neural network and the weight parameter are accessed through the reorganization module, and all hidden nodes in the network are checked to delete invalid nodes; S19: Returning bask to step S12, the acceptable single-layer neural network is used as the initial acceptable single-layer neural network of the next round, and the amount of training data is increased to perform the next step of the training until all training data complete the training.

Preferably, the learning target of the first learning algorithm may be that the residual value between the predicted value and the actual value is 0.35 or less.

Preferably, the learning target of the second learning algorithm may be that the residual value between the predicted value and the actual value is 1100 or less.

Preferably, the learning target of the third learning algorithm may be that the residual value between the predicted value and the actual value is 0.453 or less.

Preferably, the other copper material data may include a copper scrap amount, a copper price of the present week, a copper scrap price of the present week, and a copper stock amount.

Preferably, the fourth learning algorithm may include the following steps. S21: the copper prices in the next four weeks, the copper material demand in the next two months, the copper scrap price in the next four weeks, and the other copper material data are input; S22: It is determined whether the copper scrap amount is less than a copper scrap inventory limit, if not, the procedure continues to step S23, and if yes, the procedure continues to step S24; S23: It is determined whether the copper scrap amount is greater than the copper material demand in the next two months, if yes, only the copper replacement decision is executed to satisfy the copper material demand in the next two months, and if not, the copper replacement decision and the copper purchase decision are simultaneously executed to satisfy the copper material demand in the next two months; S24: It is determined whether the copper price in the next one week and the copper scrap price in the next one week are the highest points among the copper prices of the next four weeks and the copper scrap prices of the next four weeks, respectively, if yes, the copper replacement decision is recommended, and step S23 proceeds, if not, it is suggested to temporarily stock up on copper scrap quantities and execute the copper purchase decision.

Preferably, the copper material price may include a spot price of a copper material on the exchange and copper prices for the past four weeks. The mineral material price may include a gold price, a silver price, a nickel price, an aluminum price, a zinc price, and an iron price. The economic index may include an inflation index. The exchange rate index may include exchange rate prices of various countries.

Preferably, data of the copper material consumption amount may include a predicted month, a copper material serial number, a copper material consumption amount for the past 6 months, and expected copper material consumption amounts for present and next months.

Based on the above, the decision support system of industrial copper procurement of the present invention has one or more of the following advantages:

(1) The decision support system of industrial copper procurement forecasts future copper prices, forecasts future demand for raw materials required by manufacturers, forecasts future copper scrap prices, and uses other relevant data as input data of the purchase decision reasoning module, to obtain a decision reasoning model through a learning algorithm and output a decision recommendation, so that decision support recommendations can be provided to the decision maker, raw material costs of the company can be reduced, and competitiveness of the company can be improved.

(2) The decision support system of industrial copper procurement builds the forecasting model for future copper prices, future demands and future copper scrap prices through the adaptive learning algorithm, so that forecasting results related to raw material demands and prices can be obtained through the forecasting model, the decision can be conducted with the assist of the system, and validity and efficiency of a decision-making system can be improved.

(3) The decision support system of industrial copper procurement provides the decision maker with the recommendation for copper purchase or copper replacement and determines the optimal timing for the copper replacement, so that costs of purchasing copper can be reduced, the value of copper scrap in inventory can be maximized to increase the value of raw materials, and production costs can be reduced to increase manufacturing margins.

BRIEF DESCRIPTION OF THE DRAWINGS

In order to facilitate understanding of the technical features, contents, advantages, and effects to be achieved of the present invention, hereinafter, the present invention will be described using representative expressions of the embodiments in detail with reference to the drawings as follows.

DETAILED DESCRIPTION OF THE PREFERRED EMBODIMENTS

In order to understand the technical features, contents and advantages of the present invention, hereinafter, the present invention will be described using representative expressions of the embodiments in detail with reference to the drawings as follows. However, the drawings are only intended to supplement the specification as a gist, and may not correspond to the actual proportions and exact arrangements after implementation of the present invention. Therefore, it is noted that the drawings do not limit the scope of the rights to be actually implemented by the present invention upon interpretation related to the proportions and arrangement of the accompanying drawings.

Figure 1:
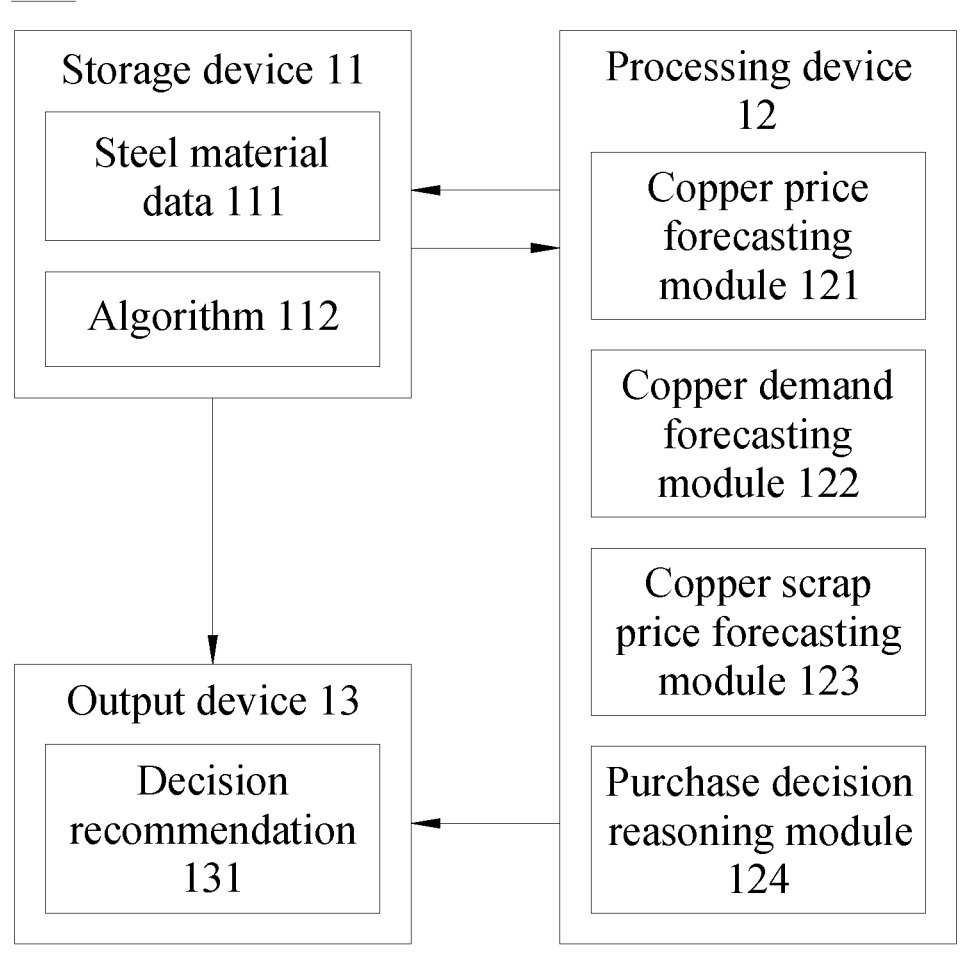
FIG. 1 is a block diagram of a decision support system of industrial copper procurement according to the embodiments of the present invention.

FIG. 1 is a block diagram of a decision support system of industrial copper procurement according to the embodiments of the present invention. As shown in the drawing, a decision support system 100 of industrial copper procurement includes a storage device 11, a processing device 12 and an output device 13. The storage device 11 may be a storage medium such as a read-only memory, a flash memory, a disk, or a cloud database of a computer device, or may be a database on a server or cloud device. The storage device stores steel material data 111 for storing various material condition information and an algorithm 112 for subsequent analysis and reasoning. The processing device 12 includes a central processing unit, a microprocessor, a graphic processing unit and the like in a computer device, is connected to the storage device 11, and accesses data in the storage device 11 to execute control commands that analyze purchase decisions.

After the processing unit 12 accesses the data in the storage unit 11, a set of four analysis models including a copper material price forecasting module 121, a copper materials demand forecasting module 122, a copper scrap price forecasting module 123 and a purchase decision reasoning module 124 may be conducted. The copper material price forecasting module 121 accesses a copper material price, a mineral material price, a comprehensive economic index and an exchange rate index. The data is preprocessed and divided into training data and test data, in which a first learning algorithm is conducted on the training data to build a copper price forecasting model, and the copper price forecasting model is verified through the test data. Copper prices in the next four weeks may be predicted through the copper price forecasting model. In other words, a week is set as a unit, four forecast copper material prices in the next one to four weeks are output. The copper material demand forecasting module 122 accesses copper material consumption data, conducts, usually after data preprocessing, a second learning algorithm on the training data to build a copper material demand forecasting model, and verifies the copper material demand forecasting model through the test data. Through the copper material demand forecasting model, the copper material demand in the next two months may be predicted, and the next two months are set as a forecast target. This is mainly because one month for delivery may remain in any case even when new copper materials are directly purchased or when copper materials are obtained by reprocessing copper scrap. Thus, an early response is required to be made in decision-making. The copper scrap price forecasting module 123 accesses a copper scrap price, a mineral material price, a comprehensive economic index and an exchange rate index, conducts a third learning algorithm to build a copper scrap price forecasting model, and forecasts copper scrap prices in the next four weeks, that is, four predicted copper scrap prices in the next 1 to four weeks, through the copper scrap price forecasting model. Copper scrap is mostly recycled from wastes generated during the production process, and the recycling cost is much lower than that of newly purchased copper material. However, the copper scrap is required to be reprocessed to form new copper materials that can be put into production. The copper scrap is not always the same as general copper materials in terms of price fluctuations. Accordingly, new copper materials and recycled copper scrap may be predicted and analyzed separately.

Thereafter, the purchase decision reasoning module 124 accesses the copper price in the next four weeks, copper material demand in the next two months, and copper scrap price in the next four weeks that are obtained by the previous three modules, and accesses other copper material data, such as a copper scrap amount, a copper price for a present week, a copper scrap price for the present week, and a copper stock amount, further conducts a fourth learning algorithm to build a decision reasoning model; and obtains a decision recommendation 131 through the decision reasoning model. The output device 13 is connected to the processing device 12 and the storage device 11. The output device 13 may be a display interface, such as a computer screen and a mobile phone screen, of a computer device. The display interface provides the decision maker with decision recommendation. The output device 13 may be a data transmission device for transmitting the decision recommendation in the form of file data to a computer device or mobile device of the decision maker so as to provide the decision recommendation to the decision maker for reference in purchasing copper materials. The decision-making recommendation is mainly to advise the decision maker whether there is a demand for raw materials at the present time, so that new copper is purchased or copper is replaced to meet the demand for the raw materials. In addition, the recommendation is provided on whether it is an appropriate time to replace the copper. Hereinafter, each module and a corresponding forecasting model will be described in the embodiment.

Figure 2:
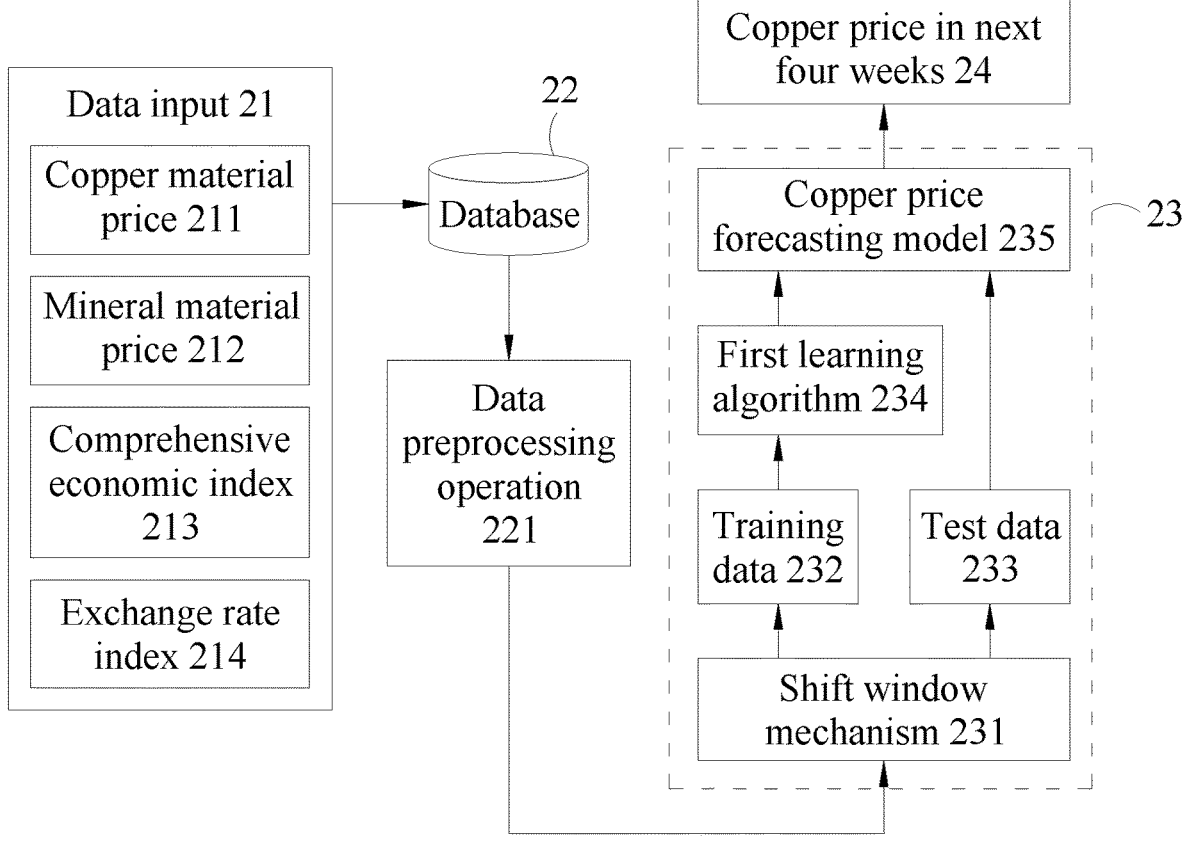
FIG. 2 is a block diagram showing a system of a copper material price forecasting module according to the embodiments of the present invention.

FIG. 2 is a block diagram showing a system of a copper material price forecasting module according to the embodiments of the present invention. As shown in the drawing, first, data input 21 is performed through a data input device. The input data is stored in a database 22. The contents of the data input 21 include inputting a copper material price 211, a mineral material price 212, a comprehensive economic index 213, and an exchange rate index 214. The copper material price 211 includes a spot price of a copper material on the exchange and copper prices for the past four weeks. The mineral material price includes prices of other industrial metals, such as gold price, silver price, nickel price, aluminum price, zinc price, and iron price. The economic index includes an inflation index. The exchange rate index includes exchange rate prices of various countries. The data is input and stored in the database 22. Since formats and units of the data are not the same, first, a data preprocessing operation 221 is performed to convert the input data into an appropriate format and input to a copper material price forecasting module 23.

The copper material price forecasting module 23 includes a shift window mechanism 231, because analysis data has time limitation. The time shift is performed based on data of different time periods, so as to ensure that the input data satisfies the requirements, and simultaneously, the input data is divided into training data 232 and test data 233. A first learning algorithm 234 is conducted using the training data 232 to build a copper price forecasting model 235, the copper price forecasting model 235 is verified through the test data 233, and the copper price 24 in the next four weeks is output through the copper price forecasting model 235. The first learning algorithm 234 is a kind of adaptive learning algorithm, and will be described below in detail.

Figure 3:
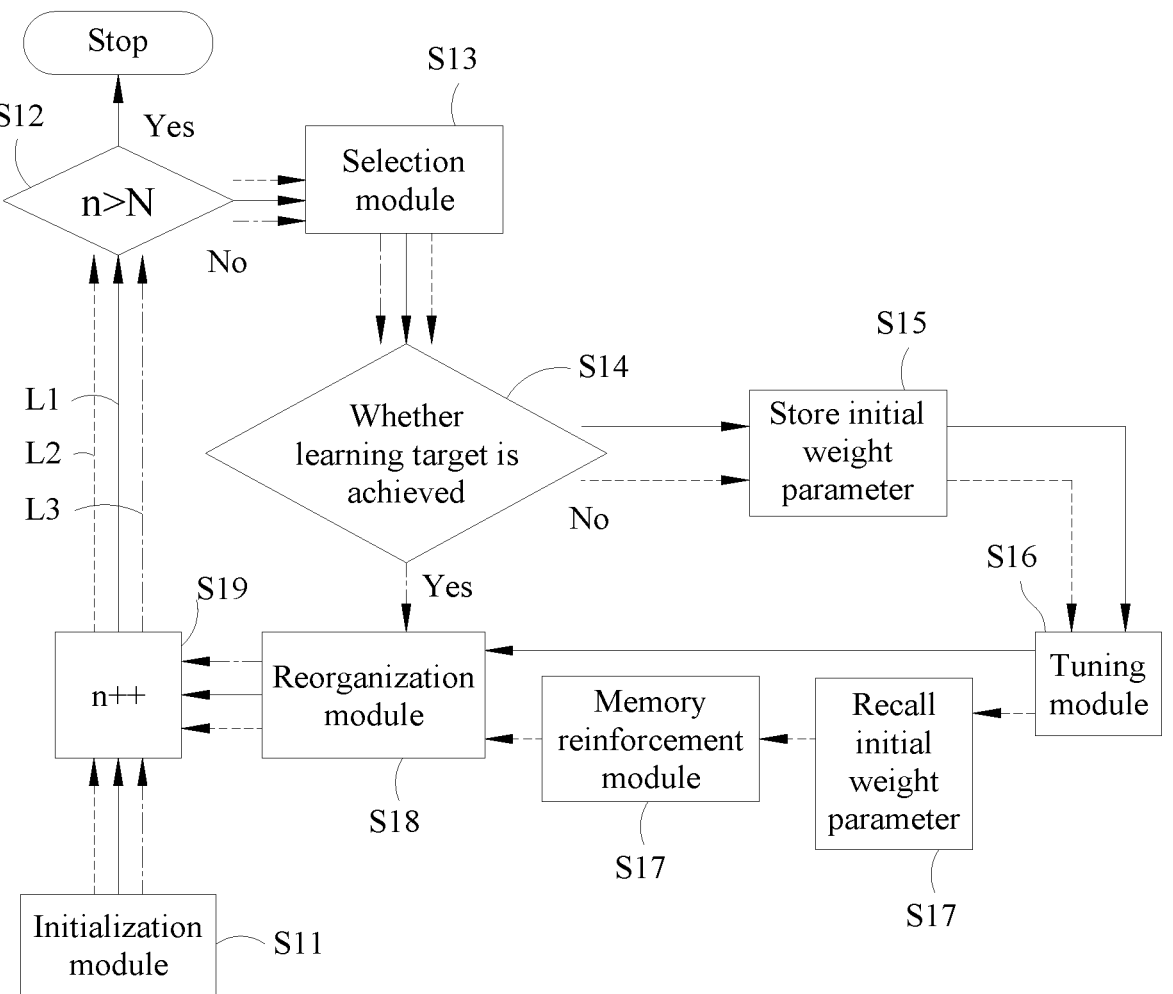
FIG. 3 is a flow chart showing steps of an adaptive learning algorithm according to the embodiments of the present invention.

FIG. 3 is a flow chart showing steps of an adaptive learning algorithm according to the embodiments of the present invention. As shown in the drawing, the adaptive learning algorithm may include three learning paths: a thinking path L1, a memory reinforcement path L2, and a reorganization path L3, and corresponding operations include the following steps S11 to S19.

Step S11: initial data is selected through an initialization module and a linear regression operation is performed to build an initial single-layer neural network, in which the initial single-layer neural network includes an initial weight parameter. The training data 232 is input and the module is initialized to select initial data from the training data 232. A linear regression operation is performed on the initial data to build an initial single-layer neural network, in which the initial single-layer neural network includes an initial weight parameter. After obtaining the initial single-layer neural network and the initial weight parameter, an input of the training data 232 starts to perform training. In the embodiment, each step of the training is to perform training in a unit of a newly added data amount, and learning is performed through one of the following three paths whenever the neural network learns: a thinking path L1, a memory reinforcement path L2 and a reorganization path L3.

Step S12: Whenever one piece of training data is added, it is determined whether the number of the input training data reaches the number of all training data. When it is "yes", a procedure stops, and when it is "no", the procedure continues to step S13. The training procedure may return to step S12 after subsequent steps. Whenever one piece of training data is added, training is performed again until the number of the training data reaches the number of all data. Thus, the training procedure is finished.

Step S13: The number of training data for each round is selected through the filter module, in which the selection mechanism makes forecasting by substituting all the training data into the acceptable single-layer neural network obtained from a previous round. Thereafter, a residual sum of squares between an actual value and a predicted value in each training data is calculated and sorted, in which a corresponding training data amount is selected in ascending order. During each round of training, the predicted value is obtained using all the training data based on the acceptable single-layer neural network obtained from a previous round, and the differences between the predicted values and the actual values are sorted in ascending order. Thereafter, data in a training data amount necessary for the current round is selected to perform the training. The filtering procedure is configured to ensure that training is performed using similar data first. Accordingly, during the procedure, the data may be sorted according to the residual sum of squares between the actual value and the predicted value of the training data. While sorting again in ascending order, a predetermined number of data is selected as selected training data.

Step S14: The selected training data is substituted into the initial single-layer neural network through a filter module, to determine whether the learning target of the training data is achieved. When it is "yes", the initial single-layer neural network is accepted and step S18 proceeds, and when it is "no", the procedure continues to step S15. During each round of training, the selected amount of training data may be substituted into an acceptable single-layer neural network from a previous round, to determine whether the selected training data satisfies meets the learning target. In the embodiment, whether the learning target can be achieved is determined according to whether the residual between the predicted value generated by substituting the selected training data and the input actual value is smaller than a preset target value. In the copper price forecasting model, the preset target value may be 0.35. However, the present invention is not limited thereto. The preset target value may be adjusted according to the input data. When the learning target of the selected training data fails to reach the preset target value, the adaptive algorithm may attempt to adjust the weight parameter, so that the single-layer neural network after adjusting the weight parameter may become an acceptable network.

Step S15: the current neural network weight parameter is stored. In the embodiment, both of the thinking path L1 and the memory reinforcement path L2 may store the initial weight parameter first.

Step S16: The current neural network weight parameter is adjusted through a tuning module, to determine whether the neural network after adjusting the parameter is in an acceptable state. When the condition is acceptable, step S18 proceeds, and when it is "no", the procedure continues to step S17. The weight parameter is adjusted through the tuning module. When the adjustment of the tuning module does not violate the adjustment criterion, it is further checked whether the learning target may be satisfied after the adjustment. When the learning target is still not satisfied, a learning rate is updated and the parameter is adjust again until the number of adjustments reaches a preset number. However, when the learning target is satisfied after the adjustment, the adjusted weight parameter after the adjustment and the corresponding single-layer neural network are considered as an acceptable neural network architecture. In other words, the reorganization module of step S18 proceeds through the thinking path L1. In addition, when the adjustment of the tuning module fails to satisfy the adjustment criterion, it is further considered whether the adjusted learning rate is less than a preset target value. When it is "yes", the adjusted learning rate is updated and the parameter is adjusted again. When it is "no", it is regarded as an unacceptable single-layer neural network. The unacceptable single-layer neural network may enter step S17 through the memory reinforcement path L2.

Step S17: The current neural network weight parameter stored in step S15 is recalled. Three hidden nodes are added through the memory reinforcement module to obtain a newly accepted single-layer neural network, and function as an acceptable single-layer neural network, and step S18 proceeds. The memory reinforcement path L2 first recalls the initial weight parameter, and a new hidden node is added through the memory reinforcement module, so that the single-layer neural network updated with the new node may satisfy the learning target, thereby becoming an acceptable network to enter the reorganization module of step S18.

Step S18: The acceptable single-layer neural network and the weight parameter are accessed through the reorganization module, and all hidden nodes in the network are checked to delete invalid nodes. Whether it is the initial single-layer neural network entered through the reorganization path L3, the single-layer neural network of the weight parameter adjusted by the tuning module in the thinking path L1, or the single-layer neural network having hidden nodes increased by the memory reinforcement module in the memory reinforcement path L2, all of the those are single-layer neural networks that satisfy the learning target. The reorganization module inspects hidden nodes in the network architecture and determines whether there is an invalid or nonfunctional node. In the determination scheme of the present embodiment, neurons in a hidden layer are sequentially and temporarily deleted, and the tuning module is used to check whether the architecture of the single-layer neural network is acceptable. When it is acceptable, it indicates that the deleted node does not affect the network. Accordingly, the deleted node is regarded as an invalid node and additionally deleted, so that an acceptable single-layer neural network is obtained. However, when it is unacceptable, a forecasting result is indicated that the deleted node has an obvious impact on the network. The node is not allowed to be removed. Accordingly, the deleted node is added again, and the next hidden node are continuously inspected until all hidden nodes are checked.

Step S19: Returning bask to step S12, the acceptable single-layer neural network is used as the initial acceptable single-layer neural network of the next round, and the amount of training data is increased to perform the next step of the training until all training data complete the training.

Figure 4:
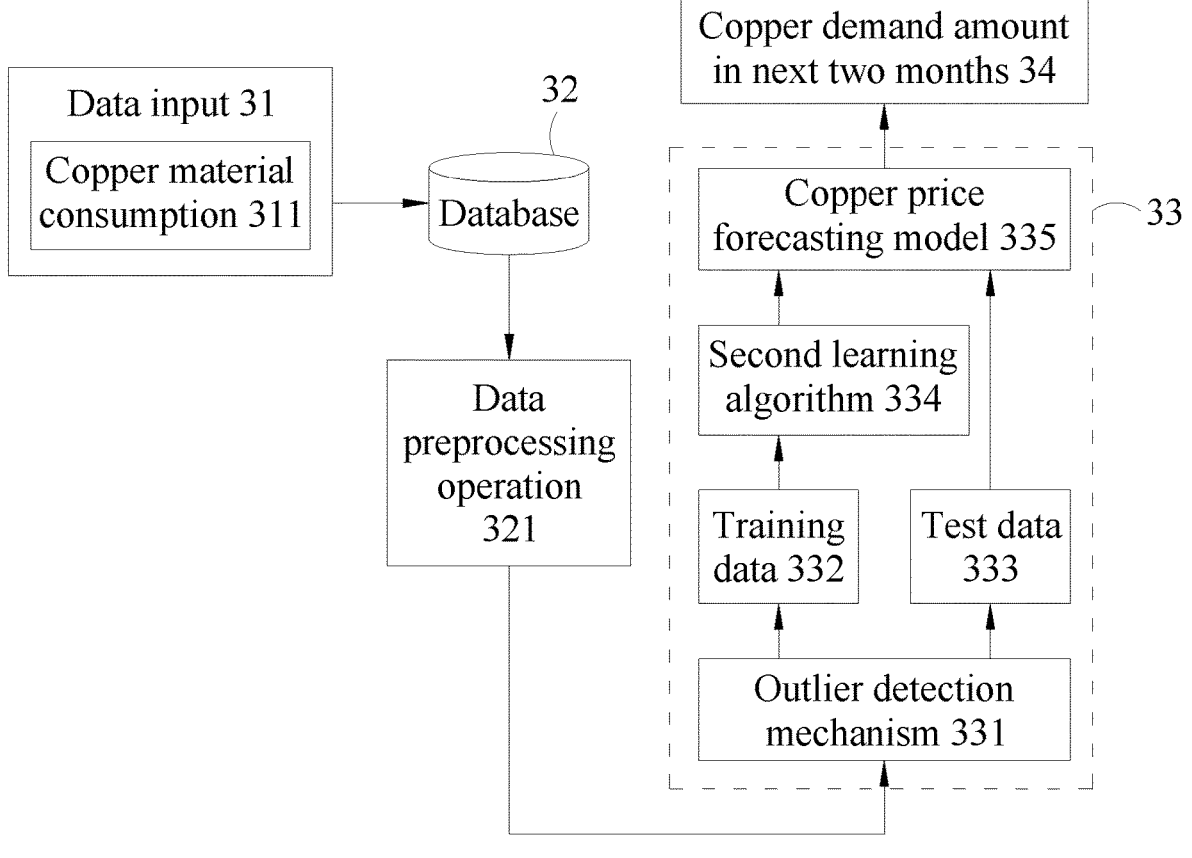
FIG. 4 is a block diagram showing a system of a copper material demand forecasting module according to the embodiments of the present invention.

FIG. 4 is a block diagram showing a system of a copper material demand forecasting module according to the embodiments of the present invention. As shown in the drawing, data input 31 is performed through a data input device. The input data is stored in a database 32. The contents of the data input 31 include inputting a copper material consumption amount 311. Data of the copper material consumption amount 311 may include a predicted month, a copper material serial number, a copper material consumption amount for the past 6 months, and expected copper material consumption amounts for present and next months. The data is input and stored in the database 32. Since formats and units of the data are not the same, first, a data preprocessing operation 321 is performed to convert the input data into an appropriate format and input to a copper material demand forecasting module 33.

The copper material demand forecasting module 33 includes an outlier detection mechanism 331. Since analytic data is historical data, monthly data with abnormal production may be removed prior to analysis in order to prevent abnormal data from affecting analysis results. In another embodiment, when the amount of analyzed data is limited or the data has a low variation situation, the data converted by the data preprocessing operation 321 may omit the outlier detection mechanism 331. All obtained data is input and subsequent analytical procedures immediately proceed. The input data is divided into training data 332 and test data 333. A second learning algorithm 334 is conducted using the training data 332 to build a copper material demand forecasting model 335, the copper material demand forecasting model 335 is verified through the test data 333, and the copper material demand 34 in the next two months is output through the copper material demand model 335. The second learning algorithm 334 is a kind of adaptive learning algorithm identical to the first learning algorithm 234, and refer to the above-described embodiments for details, and the same description will not be repeated. The difference from the above-described embodiments lies in the preset target value for the learning target. Since the types of analysis data are different, there is a slight difference in the setting of the preset target value. In the embodiment, in the residual value between the predicted value and the input actual value, the preset target value may be set to 1100. When the residual value is less than or equal to the preset target value, the learning target is achieved.

Figure 5:
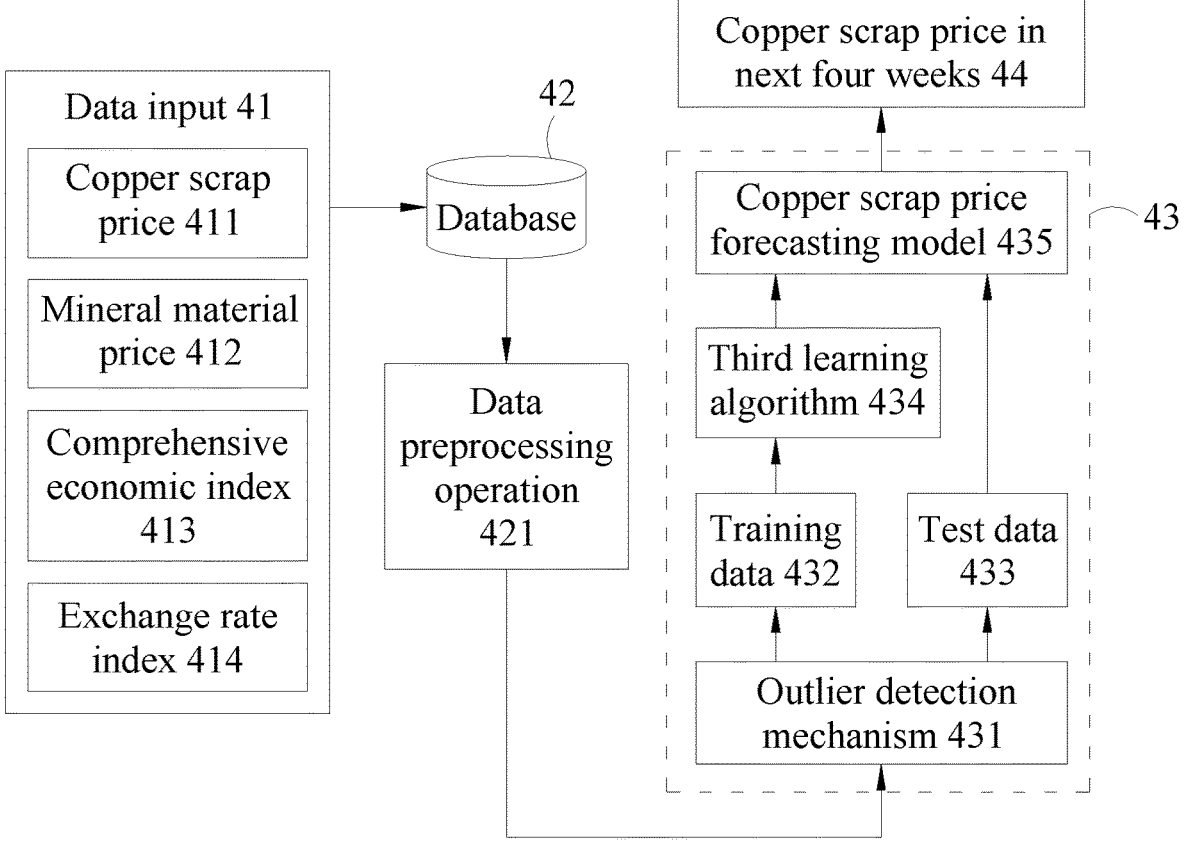
FIG. 5 is a block diagram showing a system of a copper scrap price forecasting module according to the embodiments of the present invention.

FIG. 5 is a block diagram showing a system of a copper scrap price forecasting module according to the embodiments of the present invention. As shown in the drawing, data input 41 is performed through a data input device. The input data is stored in a database 42. The contents of the data input 41 include inputting a copper scrap price 411, a mineral material price 412, a comprehensive economic index 413, and an exchange rate index 414. The copper scrap price 411 includes a spot price of a copper material on the exchange and copper scrap prices for the past four weeks. The mineral material price includes prices of other industrial metals, such as gold price, silver price, nickel price, aluminum price, zinc price, and iron price. The economic index includes an inflation index. The exchange rate index includes exchange rate prices of various countries. The data is input and stored in the database 42. Since formats and units of the data are not the same, first, a data preprocessing operation 421 is performed to convert the input data into an appropriate format and input to a copper scrap price forecasting module 43.

The copper scrap price forecasting module 43 includes an outlier detection mechanism 431. Since analytic data is historical data, monthly data with abnormal production may be removed prior to analysis in order to prevent abnormal data from affecting analysis results. In another embodiment, when the amount of analyzed data is limited or the data has a low variation situation, the data converted by the data preprocessing operation 421 may omit the outlier detection mechanism 431. All obtained data is input and subsequent analytical procedures immediately proceed. The input data is divided into training data 432 and test data 433. A third learning algorithm 434 is conducted using the training data 432 to build a copper scrap price forecasting model 435, the copper scrap price forecasting model 435 is verified through the test data 433, and copper scrap prices 44 in the next four weeks are output through the copper scrap price forecasting model 435. The third learning algorithm 434 is a kind of adaptive learning algorithm identical to the first learning algorithm 234, and refer to the above-described embodiments for details, and the same description will not be repeated. The difference from the above-described embodiments lies in the preset target value for the learning target. Since the types of analysis data are different, there is a slight difference in the setting of the preset target value. In the embodiment, in the residual value between the predicted value and the input actual value, the preset target value may be set to 0.453. When the residual value is less than or equal to the preset target value, the learning target is achieved.

Figure 6:
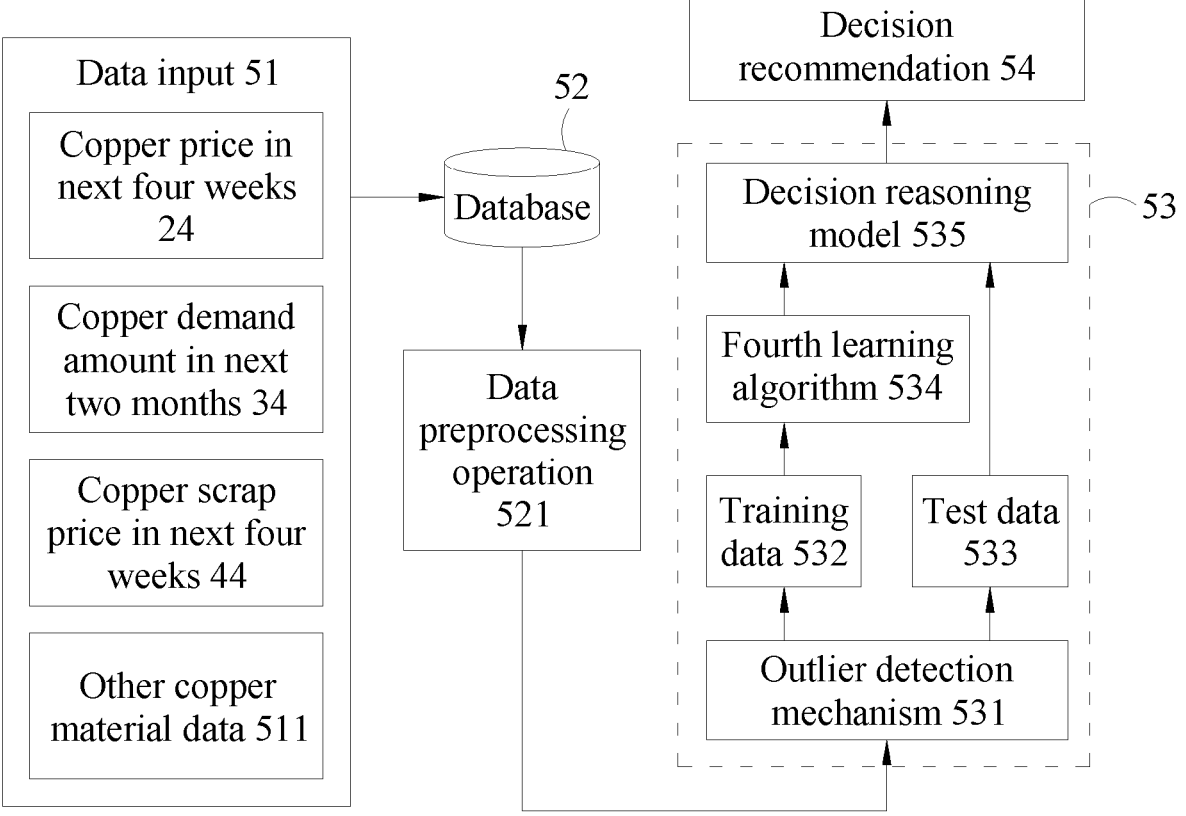
FIG. 6 is a block diagram showing a system of a purchase decision reasoning module according to the embodiments of the present invention.

FIG. 6 is a block diagram showing a system of a purchase decision reasoning module according to the embodiments of the present invention. As shown in the drawing, data input 51 is performed through a data input device. The input data is stored in a database 52. The contents of the data input 51 include the copper price 24 in the next four weeks output by the copper material price forecasting module 23, the copper material demand 34 in the next two months output by the copper material demand forecasting module 33, the copper scrap prices 44 in the next four weeks output by the copper scrap price forecasting module 43, and other copper material data 511. The other copper material data 511 may include a copper scrap amount, a copper price of the present week, a copper scrap price of the present week, and a copper stock amount. The data is input and stored in the database 52. Since formats and units of the data are not the same, first, a data preprocessing operation 521 is performed to convert the input data into an appropriate format and input to a purchase decision reasoning module 53.

The purchase decision reasoning module 53 includes an outlier detection mechanism 531. Since analytic data is historical data, monthly data with abnormal production may be removed prior to analysis in order to prevent abnormal data from affecting analysis results. In another embodiment, when the amount of analyzed data is limited or the data has a low variation situation, the data converted by the data preprocessing operation 521 may omit the outlier detection mechanism 531. All obtained data is input and subsequent analytical procedures immediately proceed. The input data is divided into training data 532 and test data 533. A fourth learning algorithm 534 is conducted using the training data 532 to build a decision reasoning model 535, the decision reasoning model 535 is verified through the test data 533, and a decision recommendation 54 is output through the decision reasoning model 535. The fourth learning algorithm 534 will be described in the following embodiments.

Figure 7:
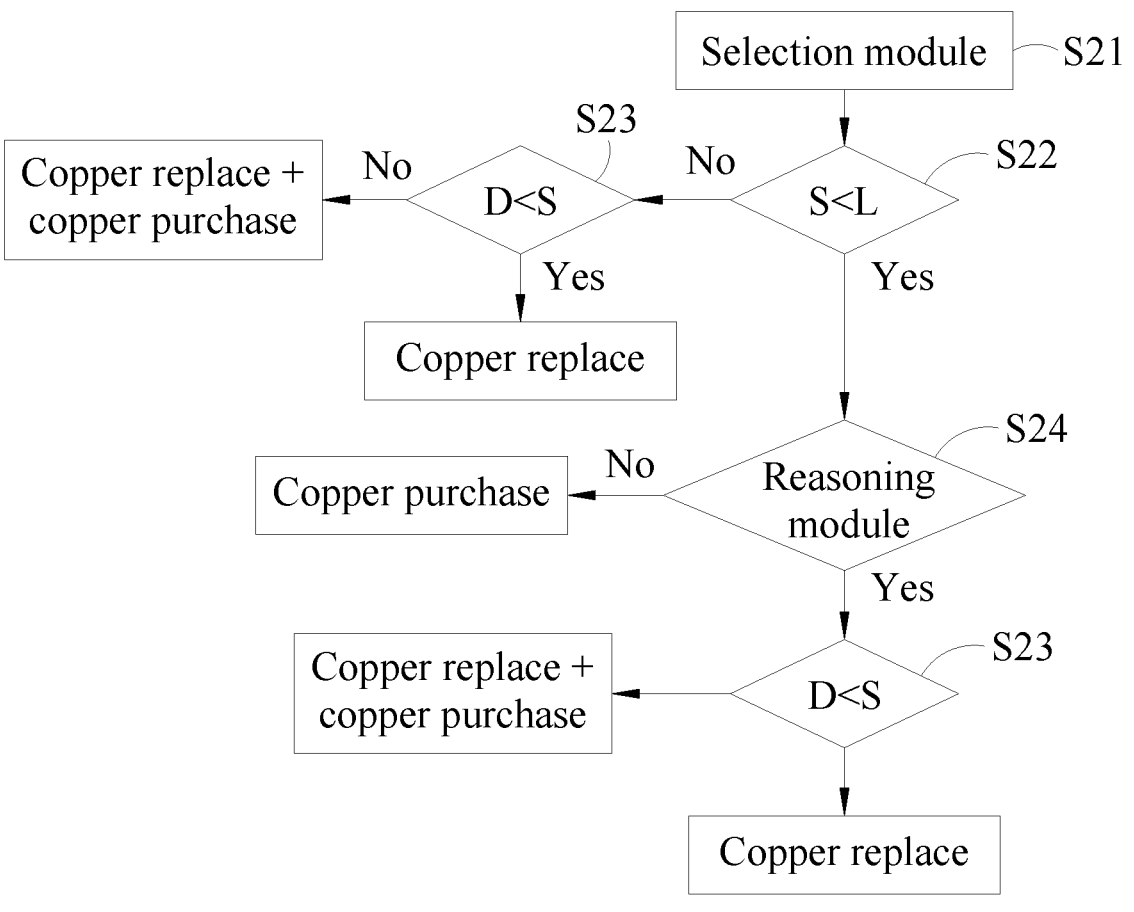
FIG. 7 is a flow diagram showing steps of a decision reasoning model algorithm according to the embodiments of the present invention.

FIG. 7 is a flow diagram showing steps of a decision reasoning model algorithm according to the embodiments of the present invention. As shown in the drawing, the operation of the fourth learning algorithm of the decision reasoning model includes the following steps S21 to S24.

Step S21: the copper prices in the next four weeks, the copper material demand in the next two months, the copper scrap price in the next four weeks, and the other copper material data are input. The purchase decision reasoning module receives the copper prices in the next four weeks output from the copper material price forecasting module, the demand for copper material in the next two months output from the copper material demand forecasting module, and the copper scrap prices in the next four weeks output from the copper scrap price forecasting module, and receives the other copper material data including the copper scrap amount, the copper price of the present week, the copper scrap price of the present week, and the copper stock amount.

Step S22: It is determined whether the copper scrap amount is less than a copper scrap inventory limit. When it is "no", the procedure continues to step S23. When it is "yes", the procedure continues to step S24. Based on the received data, it is determined whether the copper scrap amount is less than a copper scrap inventory limit. Due to a limited space in a factory for storing copper scrap, it is required to determine whether there is enough storage space when copper scrap is generated after manufacturing. When the copper scrap amount S exceeds the copper scrap stock limit L and it is indicated that the storage space is insufficient, there is no choice but to make a decision to replace the copper. Therefore, step S23 proceeds to determine whether the copper scrap amount S satisfies the demand in the next two months. Relatively, when the copper scrap amount S is still within the storable range of the copper scrap stock limit L, step S24 proceeds to determine whether it is an appropriate copper replacement timing.

Step S23: it is determined whether the copper scrap amount is greater than the copper material demand in the next two months. When it is "yes", only the copper replacement decision is conducted to satisfy the copper material demand in the next two months. When it is "no", the copper replacement decision and the copper purchase decision are simultaneously conducted to satisfy the copper material demand in the next two months. When the copper scrap amount S is more than the copper scrap stock limit L, the decision to replace the copper is required to be performed. It is determined whether the copper scrap amount S is greater than the copper material demand D in the next two months. When it is "yes", it indicates that the copper scrap amount S is sufficient to support the copper material demand D in the next two months. Copper materials may be obtained at a low cost by executing only the copper replacement decision. Relatively, when the copper scrap amount S is less than the copper material demand D in the next two months, it indicates that the copper scrap amount S is still insufficient to satisfy the production copper material demand after replacing copper. Thus, in addition to executing the copper replacement decision, the copper purchase decision is simultaneously executed to compensate for a remaining demand gap.

Step S24: It is determined whether the copper price in the next one week and the copper scrap price in the next one week are the highest points among the copper prices of the next four weeks and the copper scrap prices of the next four weeks, respectively. When it is "yes", the copper replacement decision is recommended, and step S23 proceeds. When it is "no", it is suggested to temporarily stock up on copper scrap quantities and execute the copper purchase decision. When the copper scrap amount S is not greater than the copper scrap stock limit L, it indicates that there is still enough space to store the copper scrap, and the copper replacement strategy is not required to execute in a hurry, so as to further determine whether it is the best time to replace the copper. The reasoning mechanism for determining the best time to replace copper is to determine whether the copper price and the copper scrap price in the next one week are price peaks in the near future, and accordingly, it is determined whether to replace the copper. More specifically, the copper price in the next one week is compared with the copper prices in the remaining three periods of the next four weeks. When the copper price in the next one week is the maximum, it is considered to be the price peak in the near future. Likewise, the copper scrap price in the next one week is compared with the copper scrap prices in the remaining three periods of the next four weeks. When the copper scrap price in the next one week is the maximum, it is considered to be the price peak in the near future. When the above both cases are satisfied simultaneously, it is determined that the copper materials obtained by replacing copper have the best value. The procedure enters step S23 again, it is determine whether the demand is satisfied, and it is decided whether only the copper is required to be replaced or copper is required to be purchased simultaneously. When either or both are not maximal, it is estimated that the timing is not the most appropriate for replacing the copper, and accordingly, the copper replacement decision temporarily stops and the copper scrap amount S is first stored as inventory. After waiting, the copper replacement is performed only when it is determined that the price is at a peak point. When there is the copper material demand D in the next two months, the copper purchase decision is performed to satisfy the demand.

In step S23, it may be determined whether the copper scrap amount S is greater than the copper material demand D in the next two months, thereby determining whether only the copper replacement is performed to satisfy the demand or whether new copper is required to be purchased in addition to the copper replacement. However, some manufacturers among copper material manufacturers produce much more scrap than the production, the replacement only with copper scrap fails to satisfy the production demand. Accordingly, in another embodiment, in step S23, the step of comparing the copper scrap amount S with the copper material demand D in the next two months may be omitted until the copper replacement strategy and the copper purchase strategy are simultaneously executed. More specifically, in step S22, when it is determined that there is no loading capacity in the copper scrap stock limit L, the copper replacement strategy and the copper purchase strategy are simultaneously executed. When there is still space for the copper scrap stock limit L, it is determined whether the copper replacement is not temporarily executed based on the value of copper scrap. When only the copper purchase strategy satisfies the demand or the copper scrap satisfies economic benefits, the copper replacement strategy and the copper purchase strategy are simultaneously executed.

According to the above-described decision support system of industrial copper procurement, the company can obtain appropriate advice in terms of purchasing copper materials and obtain the best solution on whether to replace copper and when to replace copper, so that timings for the copper purchase and the copper replacement can be prevented from being misjudged by relying on human experience in the related art, the decision recommendation can enable the decision maker to present accurate copper purchasing or copper replacement strategies, and the value of copper scrap in inventory can be maximized and purchasing costs can be reduced so as to obtain the highest value of copper materials, thereby supporting and providing substantial benefits to the company decision-making.

The above description is merely illustrative rather than restrictive. Any equivalent modifications or alterations without departing from the spirit and scope of the present disclosure are intended to be included in the following claims.

What is claimed is:

1. A decision support system of industrial copper procurement, comprising:
    a storage device storing a plurality of copper material data and a plurality of algorithms;
    a processing device connected to the storage device, to the processing device executing a plurality of control commands to access the storage device for conducting following modules:
    a copper material price forecasting module for inputting a copper material price, a mineral material price, a comprehensive economic index and an exchange rate index, conducting a first learning algorithm to build a copper price forecasting model, and forecasting copper prices in next four weeks through the copper price forecasting model;
    a copper material demand forecasting module for inputting copper material consumption data, conducting a second learning algorithm to build a copper material demand forecasting model, and forecasting the copper material demand in next two months through the copper material demand model;
    a copper scrap price forecasting module for inputting a copper scrap price, the mineral material price, the comprehensive economic index and the exchange rate index, conducting a third learning algorithm to build a copper scrap price forecasting model, and forecasting copper scrap prices in the next four weeks through the copper scrap price forecasting model;
    a purchase decision reasoning module for inputting the copper prices in the next four weeks, the copper material demand in the next two months, the copper scrap price in the next four weeks, and the other copper material data, conducting a fourth learning algorithm to build a decision reasoning model, and obtaining a decision recommendation through the decision reasoning model; and
    an output device connected to the processing device and the storage device for outputting decision recommendations for enabling a decision maker to carry out copper material purchase;
    wherein the first learning algorithm, the second learning algorithm, and the third learning algorithm include an adaptive learning algorithm;
    wherein the adaptive learning algorithm includes the following steps:
    S11: selecting initial data through an initialization module and performing a linear regression operation to build an initial single-layer neural network, wherein the initial single-layer neural network includes initial weight parameter;
    S12: adding one piece of training data every time and determining whether a number of the input training data reaches a number of all training data, if yes, a procedure stops, and if not, the procedure continues to step S13;
    S13: selecting a number of training data for each round through a filter module, the selection is configured to make forecasting by substituting all the training data into the acceptable single-layer neural network obtained from a previous round, and thereafter, a residual sum of squares between an actual value and a predicted value in each training data is calculated and sorted, a corresponding training data amount is selected in ascending order;
    S14: substituting the selected training data into the initial single-layer neural network through the filter module, determining whether a learning target of the training data is achieved, if yes, the initial single-layer neural network is accepted and proceeds to step S18, and if not, the procedure continues to step S15;
    S15: storing a current neural network weight parameter;
    S16: adjusting the current neural network weight parameter through a tuning module to determine whether the neural network after adjusting the parameter is in an acceptable state, if the condition is acceptable, proceeds to step S18, and if not, the procedure continues to step S17;
    S17: recalling the current neural network weight parameter stored in step S15, adding three hidden nodes through the memory reinforcement module to obtain a newly accepted single-layer neural network, and function as an acceptable single-layer neural network, and step S18 proceeds;
    S18: accessing the acceptable single-layer neural network and the weight parameter through the reorganization module, and checking all hidden nodes in the network to delete invalid nodes; and
    S19: returning back to step S12, using the acceptable single-layer neural network as the initial acceptable single-layer neural network of a next round, and increasing the training data amount to perform a next step of the training until all training data complete the training.

2. The decision support system of claim 1, wherein the learning target of the first learning algorithm is that a residual value between a predicted value and an actual value is 0.35 or less.

3. The decision support system of claim 1, wherein the learning target of the second learning algorithm is that a residual value between a predicted value and an actual value is 1100 or less.

4. The decision support system of claim 1, wherein the learning target of the third learning algorithm is that a residual value between a predicted value and an actual value is 0.453 or less.

5. The decision support system of claim 1, wherein the other copper material data includes a copper scrap amount, a copper price of the present week, a copper scrap price of the present week, and a copper stock amount.

6. The decision support system of claim 5, wherein the fourth learning algorithm includes:

S21: inputting the copper prices in the next four weeks, the copper material demand in the next two months, the copper scrap price in the next four weeks, and the other copper material data;

S22: determining whether the copper scrap amount is less than a copper scrap inventory limit, if not, the procedure continues to step S23, and if yes, the procedure continues to step S24;

S23: determining whether the copper scrap amount is greater than the copper material demand in the next two months, if yes, only a copper replacement decision is executed to satisfy the copper material demand in the next two months, and if not, the copper replacement decision and a copper purchase decision are simultaneously executed to satisfy the copper material demand in the next two months; and S24: determining whether the copper price in the next one week and the copper scrap price in the next one week are the highest points among the copper prices of the next four weeks and the copper scrap prices of the next four weeks, respectively, if yes, the copper replacement decision is recommended, and proceeds to step S23, and if not, a recommendation is provided to temporarily stock up on copper scrap quantities and execute the copper purchase decision.

7. The decision support system of claim 1, wherein the copper material price includes a spot price of a copper material on the exchange and copper prices for the past four weeks, the mineral material price includes a gold price, a silver price, a nickel price, an aluminum price, a zinc price, and an iron price, the economic index includes an inflation index, and the exchange rate index includes exchange rate prices of various countries.

8. The decision support system of claim 1, wherein data of the copper material consumption amount includes a predicted month, a copper material serial number, a copper material consumption amount for the past 6 months, and expected copper material consumption amounts for present and next months.

* * * * *